United States Patent Office 3,256,104
Patented June 14, 1966

---

3,256,104
REFRACTORY
Ernest P. Weaver, Pittsburgh, Pa., assignor to Harbison-Walker Refractories Company, Pittsburgh, Pa., a corporation of Pennsylvania
No Drawing. Filed Aug. 2, 1965, Ser. No. 476,683
16 Claims. (Cl. 106—55)

This application in part contains and claims the subject matter of my copending application Serial Number 398,782 (now abandoned), filed September 23, 1964 entitled "Material for Forming Refractory Monoliths." It further in part contains and claims the subject matter of my copending application Serial Number 425,619 (now abandoned), filed January 14, 1965 entitled "Bonded Refractory." This latter application is a continuation-in-part of the former one. The benefits of 35 U.S.C. 120 are hereby claimed.

This invention relates to compositions particularly suited for the formation of refractory monoilths. In one aspect, this invention relates to refractory linings of the type found in oxygen converter vessels.

In certain metallurgical processes, such as in the oxygen steelmaking process which has been variously designated as the LD process, oxygen Bessemer process, oxygen converter process or "Kaldo" process, the basic furnace structure is comprised of a metal skin or shell having a refractory lining interiorly thereof, to define the furnace space in which the process is carried out. Generally, the refractory lining of these oxygen steelmaking vessels is comprised of an inner "working" lining of such as tar bonded, chemically bonded, or burned basic brick, an outer lining adjacent the inner wall of the metal shell usually of a burned magnesite brick, and an intermediate layer.

The intermediate layer is usually monolithic, and is formed by such as ramming of a refractory composition in situ. The intermediate layer can vary in thickness, depending on the vessel being lined and the operating parameters to which the linging is to be subjected. It has been suggested that the composition of the intermediate layer be a tar bonded ramming mix. An example of a prior tar bonded ramming mix, which could be usable to form this intermediate layer, is a dead burned dolomite or magnesite or mixture of dolomite and magnesite with additions of such as creosote, furfuryl, pitch, tar, or the like, as the binder.

When using some types of pitch additions, some difficulty is encountered in the actual installation of the intermediate layer. For example, powdered bond pitch has a melting point in the range 275 to 325° F. In order to obtain the necessary tackiness, plasticity, and workability in such a ramming mix, it is necessary to heat the materials to melt them or to dissolve them in an organic solvent; and this heated mixture is maintained at an elevated temperature prior to and during the actual ramming.

Some mixtures have been suggested which need be heated to only about 100–120° F. to produce a mix which may be worked satisfactorily. However, even this 100 to 120° F. minimum temperature can be difficult to maintain, particularly during the colder winter months, and requires complicated auxiliary apparatus at an installation site for this purpose.

Even more distressing, however, when using some organic solvents, is that they tend to volatilize excessively when heated, thereby raising the possibility of explosion in a confined working area, as well as the undesirable irritation of the epidermis of the people in the area. Some solvents are poisonous.

Thus, it is an object of this invention to provide an improved monolith-forming refractory bonded with a nonaqueous, carbonaceous material. It is still further object of the invention to provide an improved, tar bonded, basic refractory ramming mix particularly suited for fabrication of the intermediate layer, between the outer and inner working lining of a basic oxygen furnace, which material is workable at room temperature (on the order of 70° F.), does not have the disagreeable, dangerous, and poisonous characteristics of various organic solvents and yet which has the desired tackiness, plasticity, and workability to facilitate use.

Briefly, according to one aspect of this invention, there is provided a basic refractory ramming mix comprised of size graded, basic refractory aggregate and a nonaqueous, carbonaceous, bonding system. This bonding system is comprised of medium and/or hard pitch and a selected, unsaturated, fluid pitch, which is derived from the process of distilling linseed fatty acids and soy fatty acids from linseed oil and soybean oil. Preferably, the total bonding system amounts to between about 3 to 8 parts, by weight, for each 100 parts, by weight, of basic refractory aggregate. The preferred basic refractory aggregate is selected from the group consisting of dead burned dolomite, dead burned magnesite, and sometimes mixtures thereof. In addition, hard burned lime is sometimes used in combination with dead burned dolomite and dead burned magnesite.

In addition to such materials as medium pitch, hard pitch, and creosote, the prior art has taught the use of such carbonaceous materials as bunker "C" oil, gilsonite, linseed oil, shale tar, asphalt, oil pitches of the type recovered from the distillation and cracking of oils of asphalt, coal, peat, lignite, such materials as heavy water gas tar, light water gas tar, oil-gas tar, wood tar, certain types of waxes, and like materials.

This invention further relates to tar bonded or chemically bonded brick of the type usable in the working lining of oxygen steelmaking vessels.

An example of a prior tar bonded brick is one of dead burned dolomite or magnesite or mixture of dolomite and magnesite, perhaps also with some hard burned lime, with additions of such as creosote, furfuryl, pitch, tar, or the like, as the binder.

When using some types of pitch additions, some difficulty is encountered. For example, powdered bond pitch has a melting point in the range 275 to 325° F. In order to obtain the necessary tackiness, plasticity, and workability in the brick mix, it is necessary to heat the materials to melt them or to dissolve them in an organic solvent; and this heated mixture is maintained at an elevated temperature prior to and during the actual forming of brick at the brick press.

More distressing, however, when using some organic solvents, is that they tend to volatilize excessively when heated, thereby raising the possibility of explosion in a confined working area, as well as the undesirable irritation of the epidermis of the people in the area. Some solvents are poisonous. Further, volatiles tend to accumulate in plant ventilation systems.

Thus, it is an object of this invention to provide an improved basic refractory shape or brick bonded with a nonaqueous, carbonaceous material. It is a still further object of the invention to provide an improved, tar bonded, basic refractory mix particularly suited for use in fabrication of the inner working lining of a basic oxygen furnace, which material is workable at room temperature (on the order of 70° F.), does not have the disagreeable, dangerous, and poisonous characteristics of various organic solvents and yet which has the desired tackiness, plasticity, and workability to facilitate use.

Briefly, according to this other aspect of this invention, there is provided a basic refractory brick making mix comprised of size graded, basic refractory aggregate and

Table II

| Mix No. | 1 | 2 | 3 | 4 | 5 |
|---|---|---|---|---|---|
| Basic Aggregate | 100% | 100% | 100% | 100% | 100%. |
| Powdered Hard Pitch | 2% | 2% | 2% | 2% | 2%. |
| Liquid Bond Addition (as indicated below) | 3% | 3% | 3% | 3% | 3%. |
| Liquid Bond Added | 3% furfuryl alcohol. | 3% soybean pitch. | 3% linseed oil. | 3% soybean pitch. | 3.5% soybean pitch. |
| Bulk Density, pcf (Av. 5) | 168 | 174 | 173 | 176 | 177. |
| Load to Crush—On Edge (Av. 5) (Room Temp. of about 70° F) | 210 | 320 | 130 | 490 | 550. |
| Modulus of Rupture After Coking at 2910° F., p.s.i. (Av. 2) | No tested | Not tested | Not tested | 190 | 400. |
| Remarks | Rammed poorly, strong odor of furfuryl alcohol. | Rammed well, no offensive odor. | Rammed poorly, no offensive odor. | Rammed well, no offensive odor. | Rammed well, no offensive odor. |

Mixes 1, 2, and 3 were pressed at 3,000 p.s.i. and Mixes 4 and 5 at 4,000 p.s.i., which explains why the shapes of Mixes 2 and 4, otherwise identical, gave different results in physical testing. While some of the test pieces were formed on a brickmaking machine, in order to obtain substantially uniformly sized pieces which would give good comparative physical testing data, the notes regarding ramming characteristics refer to additional work on the same mixes in which they were rammed into a form.

A totally unexpected and useful aspect of the use of my selected unsaturated fatty acid pitches was the unusually high cold crushing strength. Compare, for example, Mixes 1 and 3 with Mixes 2, 4 and 5. Mixes 4 and 5, pressed at a higher pressure, had cold crushing strengths in the range 490 to 550 p.s.i.

Table II also shows that 3.5% of the soybean pitch is much better than the 3% addition, if one wishes high temperature strength. Note the modulus of rupture after coking at 2910° F., in which an increase from 3 to 3.5% of soybean pitch produced a little better than double the modulus of rupture.

The monolith forming mixes of this invention are also characterized by their ability to stay loose, relatively unconsolidated, and readily workable, for long periods of time in storage; for example, a month or so.

I noted, above, that 3 to 8 parts, by weight, of total bonding mixture is suggested for each 100 parts, by weight, of refractory. Up to 10% is satisfactory. A preferred range is 5 to 6 parts, by weight, for each 100 parts, by weight, of the refractory. In either event, I prefer that the selected fatty acid pitch constitute from 3 to 3.5 parts, by weight, of the bonding mix, based on the weight of the refractory when making my monolith forming mixes.

As is understood by those in the art, hard pitch is added to the mix to obtain as much fixed carbon as is commercially feasible. Since my unsaturated fatty acid pitches do not require solution of the hard pitch for tackiness, one can also use such as graphite or lamp black as the source of the carbon. Gilsonite could also be used. The total quantity of bonds (i.e. 3 to 10 parts, by weight, based on the total weight of the refractory, being operable and 5 to 6 parts, by weight, being preferred), however, will contain at least about 3 parts, by weight, of my selected unsaturated fatty acid pitch, whether hard pitch, medium pitch, graphite, lamp black, or the like constitutes the remainder of the bonds. The foregoing is true in both monolith and brick mixes according to the invention.

Also, where little or no fixed carbon is necessary, it is possible to use my unsaturated fatty acid pitches alone. Further, where little fixed carbon is required, it can be used in combination with various polymers, such as acrylics, polyamides, polyesters, epoxies, and the like, to obtain a thermo-setting bond.

In a broader aspect of the invention, the refractory aggregate used for making my monolith forming mixes and in the brick mixes need not be basic refractory. Further, in less critical areas of the oxygen converter vessel, such as the intermediate and vessel backup portions of the lining, it is possible to use basic refractory materials other than dead burned magnesia, dead burned dolomite, and lime (calcia); for example, forsterite, olivine, chrome ore, and the like. The unique properties of my bonding material also make them desirable for use with refractory aggregates such as calcined fire clays, ganisters, high alumina materials such as diaspore, Alabama and South American bauxite, kyanite, alumina, and mullite. It can be used with mixtures which include silicon carbide and the like, if one so desires, further including zircon, zirconia, and other well-known refractory materials used for the manufacture of monolith forming mixes such as ramming mixes and brick mixes.

An exemplary analysis of the dead burned dolomite and magnesia which were used to manufacture the test pieces of Table I is as follows:

| | Magnesite | Dolomite |
|---|---|---|
| Silica ($SiO_2$) | About 2.8% | About 1.2%. |
| Alumina ($Al_2O_3$) | About 0.3% | About 0.8%. |
| Iron Oxide ($Fe_2O_3$) | | About 5.0%. |
| Lime ($CaO$) | About 1.5% | About 53.0%. |
| Magnesia ($MgO$) | About 94.8% | About 38.9%. |

In the foregoing discussion, I specifically mentioned the unsaturated fluid pitches recovered from the distillation of fatty acids from linseed oil or soybean oil. It is, of course, understood that the unsaturated pitch residue of the distillation of fatty acids from other vegetable oils are satisfactory for the practice of this invention. However, the selected fluid pitch should be characterized by physical properties similar to those set forth above, i.e. liquid or fluid at room temperature, characterized by extensive unsaturation (as measured by iodine number), and capable of imparting the necessary tackiness, workability, and plasticity to the ramming mix in which they are included.

The lowest practical limit for the unsaturated fluid fatty acid pitches of this invention is about 3%, by weight, based on total refractory weight. The upper limit is about 8 to 10% when fixed carbon is unimportant or at least of minor importance.

In some manner not completely understood, when the brick forming batch mixture of this invention is made into brick on a brick press, my selected unsaturated fluid pitch provides all of the workability, plasticity, and tackiness required. There is no necessity to heat the material in order to put some of the powdered hard pitch in solution to obtain tackiness.

The data of Table II above, Mixes 3 and 4, based on shapes formed on a brick press are illustrative of the physical properties of brick which can be made on a brick press following the teachings of this invention.

In the foregoing discussion, all parts and percentages are by weight, all refractory chemical analyses should be considered but typical and are on an oxide basis, in conformity with the normal practices of reporting the chemical constituents of refractory materials. All sizing is according to the standard Tyler series of screens or sieves, unless specifically noted to the contrary.

Having thus described the invention in detail and with sufficient particularity to enable those skilled in the art to practice it, what is desired to have protected by Letters Patent is set forth in the following claims:

I claim:
1. In refractory batches bonded with selected nonaqueous carbonaceous bond materials which mixes consist essentially of about 100 parts, by weight, of refractory and on the order of 3 to 10 parts, by weight, of the bond material, the improvement consisting essentially of said bond material including an unsaturated fluid pitch which is the residue recovered from the distillation of vegetable oils to remove fatty acids therefrom and in a quantity sufficient to obtain workability, plasticity, and tackiness in the batch when installed in the situs of use.

2. The batches of claim 1 in which the fluid pitch is selected from the group consisting essentially of linseed pitch and soybean pitch.

3. The batches of claim 1 in which the carbonaceous bond materials constitute between about 5 and 6 parts, by weight, of the mix.

4. The batches of claim 1 in which the bond material includes the unsaturated fluid pitch and a nonaqueous, carbonaceous material, solid at room temperature, which provides a coke residue at elevated temperatures and selected from the group consisting of medium pitch and powdered hard pitch.

5. The batches of claim 1 in which the bond material essentially includes about 3 to 3½ parts, by weight, of the unsaturated fluid pitch.

6. In unconsolidated, basic refractory ramming mixes bonded with selected nonaqueous carbonaceous bonding material which mixes consist essentially of 100 parts, by weight, of basic refractory and about 5 to 6 parts, by weight, of the bond, the improvement consisting essentially of said bond material including 3 to 3½ parts, by weight, of an unsaturated fluid pitch selected from the group consisting essentially of linseed pitch and soybean pitch, the remainder of the bond material being powdered hard pitch.

7. In unconsolidated basic refractory ramming mixes bonded with selected nonaqueous carbonaceous bond materials which mixes consist essentially of about 100 parts, by weight, of refractory and on the order of 3 to 10 parts, by weight, of bond material, the improvement consisting essentially of said bond material including an unsaturated fluid pitch which is the residue recovered from the distillation of vegetable oils to remove fatty acids therefrom, and in a quantity sufficient to obtain workability, plasticity, and tackiness in the mix when installed in a situs of use.

8. In unconsolidated refractory ramming mixes bonded with selected nonaqueous carbonaceous bond materials which mixes consist essentially of about 100 parts, by weight, of refractory and on the order of 3 to 10 parts, by weight, of the bond material, the improvement consisting essentially of said bond material being at least about 3 parts, by weight, based on total refractory weight, of an unsaturated fluid pitch which is the residue recovered from the distillation of vegetable oils to remove fatty acids therefrom.

9. The mix of claim 8 in which the bond material further includes materials selected from the group consisting of graphite, lamp black, and mixtures thereof.

10. In a basic refractory brick bonded with selected nonaqueous carbonaceous bond material, which mixes consist essentially of about 100 parts, by weight, of refractory and on the order of 2 to 12 parts, by weight, of bond material, the improvement consisting essentially of said bond materials including an unsaturated fluid pitch which is the residue recovered from the distillation of vegetable oils to remove fatty acids therefrom, in an amount sufficient to obtain workability and plasticity in said mixes at the brick press.

11. The brick of claim 10 in which the fluid pitch is selected from the group consisting essentially of linseed pitch and soybean pitch.

12. The brick of claim 10 in which the carbonaceous bond materials constitute between about 5 and 6 parts, by weight, of the mix, based on the weight of the refractory in the mix.

13. The brick of claim 10 in which the bond material essentially includes about 3 to 3½ parts, by weight, of the unsaturated fluid pitch.

14. In a refractory brick bonded with selected nonaqueous carbonaceous bond materials, which mixes consist essentially of about 100 parts, by weight, of refractory and on the order of 2 to 12 parts, by weight, of bond materials, the improvement consisting essentially of said bond materials including 2 to 10 parts, by weight, of an unsaturated fluid pitch which is the residue recovered from the distillation of vegetable oils to remove fatty acid therefrom and in a quantity sufficient to obtain workability, plasticity and tackiness in the mix at the brick press.

15. The brick of claim 10 in which the carbonaceous bond includes the fluid pitch and material selected from the group consisting of medium pitch and powdered hard pitch.

16. The brick of claim 10 in which the carbonaceous bond includes the fluid pitch and material selected from the group consisting of graphite and lamp black.

References Cited by the Examiner
UNITED STATES PATENTS

| | | | |
|---|---|---|---|
| 2,222,188 | 11/1940 | White | 106—56 |
| 3,070,449 | 12/1962 | Davies et al. | 106—56 |

TOBIAS E. LEVOW, *Primary Examiner.*

J. POER, *Assistant Examiner.*